US008682300B2

(12) United States Patent
Stopel et al.

(10) Patent No.: US 8,682,300 B2
(45) Date of Patent: *Mar. 25, 2014

(54) ADAPTATION OF NOTIFICATION PERIMETER BASED ON RELEVANCE TO A USER

(75) Inventors: Dima Stopel, Herzliya Merkaz (IL); Yair E. Geva, Zichron Yaakov (IL)

(73) Assignee: Microsoft Corporation, Redmond, WA (US)

( * ) Notice: Subject to any disclaimer, the term of this patent is extended or adjusted under 35 U.S.C. 154(b) by 343 days.

This patent is subject to a terminal disclaimer.

(21) Appl. No.: 13/118,490

(22) Filed: May 30, 2011

(65) Prior Publication Data

US 2012/0306660 A1 Dec. 6, 2012

(51) Int. Cl.
*H04M 3/42* (2006.01)
(52) U.S. Cl.
USPC ............... 455/414.1; 455/456.3; 701/516
(58) Field of Classification Search
USPC ............. 455/412.1, 414.1, 456.1, 456.3, 457; 340/539.11, 539.13; 701/516, 517
See application file for complete search history.

(56) References Cited

U.S. PATENT DOCUMENTS

| | | | |
|---|---|---|---|
| 7,394,405 B2 * | 7/2008 | Godden | 340/996 |
| 7,577,522 B2 * | 8/2009 | Rosenberg | 340/539.13 |
| 7,649,454 B2 | 1/2010 | Singh et al. | |
| 7,848,765 B2 | 12/2010 | Phillips et al. | |
| 2006/0224319 A1 * | 10/2006 | Rogers | 701/213 |
| 2010/0093371 A1 | 4/2010 | Gehrke et al. | |
| 2010/0250131 A1 | 9/2010 | Relyea et al. | |
| 2010/0295676 A1 | 11/2010 | Khachaturov et al. | |

OTHER PUBLICATIONS

Sameed, "Set Location-Based Reminders on Android With Geo Reminders", Retrieved at <<http://www.addictivetips.com/mobile/set-location-based-reminders-on-android-with-geo-reminders/>>, Mar. 8, 2011.
Murfitt, Dan., "Location based reminders", Retrieved at <<http://murfittnet/blog/dan/2010/01/07/location-based-reminders>>, Jul. 1, 2010.
Samuels, Michael., "Intelligent Reminder", Retrieved at <<http://www.androidzoom.com/android_applications/productivity/intelligent-reminder_rvsl.html>>, Retrieved Date: Mar. 23, 2011.

* cited by examiner

*Primary Examiner* — Thomas Mullen
(74) *Attorney, Agent, or Firm* — Steve Spellman; Jim Ross; Micky Minhas (57) ABSTRACT

Location-based notification architecture that provides notification relevance to a user and/or a user goal. The size of the virtual perimeter or boundary is changed dynamically based on changes in relevance to a user and/or user goal, and thus, can be made dependent on various factors. The size of the perimeter can increase or decrease according to user preferences that are learned over time (e.g., preference for a gas station of a specific company). These capabilities improve the relevance of the notification the user receives. The relevance of a notification to the user can be improved by tuning the perimeter size according to known parameters that depend on the point of interest (e.g., business) itself and/or by tuning of the size of virtual perimeter according to parameters associated with user behavior. Other parameters can be considered as well, such as environmental conditions, and traffic conditions, for example.

20 Claims, 8 Drawing Sheets

ADAPTATION OF NOTIFICATION PERIMETER BASED ON RELEVANCE TO A USER

BACKGROUND

In the ever-evolving mobile world of people and systems, it is becoming increasingly desirable to know the whereabouts of such entities, and more specifically the whereabouts of people relative to other locations of interest. Geo-fence is a technology that defines a virtual perimeter relative to a physical geographic location. When a device, for example, coupled with a location-based service, interacts with the virtual perimeter, the user is notified via the device of information associated with the geo-fence.

Notifications can be set on any geographic point of interest, such as a business. Consider an example where a user needs to fill a gas tank. The user sets a group of reminders on all gas stations in the area. On the way home, the user triggers the geo-fence of a specific gas station and automatically receives a notification that the specific gas station is near.

The size of the perimeter associated with a point of interest can be significantly bigger than the footprint of the business itself to provide the notification about the business to the user when the user is nearby. Moreover, traditional solutions for geo-fences use a fixed size perimeter in association with a place of interest, which implies that the probability of receiving a reminder for a business over time remains the same, since the perimeter for that point of interest remains the same. The use of static perimeters limits the benefits of a geo-fence that could otherwise be available to the user.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is a location-based notification service that provides notification relevance to the user. The size of the virtual perimeter or boundary is changed dynamically based on changes in relevance to a user and/or user goal, and thus, can be made dependent on various factors. The initial size (e.g., area) of the virtual perimeter is based on a static data (e.g., gas price for a specific gas station). The size of the perimeter can increase or decrease according to user preferences that are learned over time (e.g., preference for a gas station of a specific company). These capabilities improve the relevance of the notification the user receives.

More generally, the relevance of a notification to the user can be improved by tuning the perimeter size according to known parameters that depend on the point of interest (e.g., business) itself. Additionally, the relevance of a notification to the user can be improved by subsequent tuning of the size of virtual perimeter according to parameters associated with user behavior. Other parameters can be considered as well, such as environmental conditions, and traffic conditions, for example.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Geo-fence is a technology of setting an automatic notification on a specific geographic point of interest or region. A virtual perimeter is created and associated with the point of interest or region. When the user device enters the specific region or point of interest the notification is activated. The notification mechanism can be set on any geographic region, particularly on businesses, or a group of businesses (reminder per business).

Consider an example where the user needs to fill a gas tank. The user sets a group of geo-fences on all gas stations in the area (e.g., with one click of a mouse). On the way home, the user enters the perimeter of the first geo-fence and receives a notification that a specific gas station is nearby.

The size of the virtual perimeter can be significantly bigger than the size of the business itself in order to remind the user about the business when nearby. Thus, every geo-fence has a geometric shape associated with it. When the user enters that geometric shape, the notification mechanism (e.g., location-based service) is triggered.

It is to be understood in this description that embodiments may illustrate circular geo-fences; however, the disclosed architecture applies equally to any geo-fence shape. With respect to circular geo-fences, the radius defines its area (and perimeter size).

It is clear that a user has certain preferences for specific places over other places. This preferences information can be inferred over time by measuring the actual places the user visited. An example for such a preference can be gas stations that have cheaper prices, or coffee shops that sell a coffee of a specific mark.

The disclosed architecture improves reminder relevance to the user. The size of the geo-fence perimeters is dynamic and can be made dependent on various factors. The relevance of a geo-fence to the user can be tuned according to known parameters that depend on the business itself and/or by subsequent tuning of the geo-fence according to actual behavior of the user.

The size of the geo-fence on a specific point of interest (e.g., a business) is dynamic, and changes according to the relevance of this specific place for the user. Relevance defined with parameters that are independent of user behavior include product prices, popularity of the place, its rating, etc. Relevance described with parameters that are derived from user behavior include user likes for a certain type of coffee, user prefers gas stations of a certain company, and so on.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
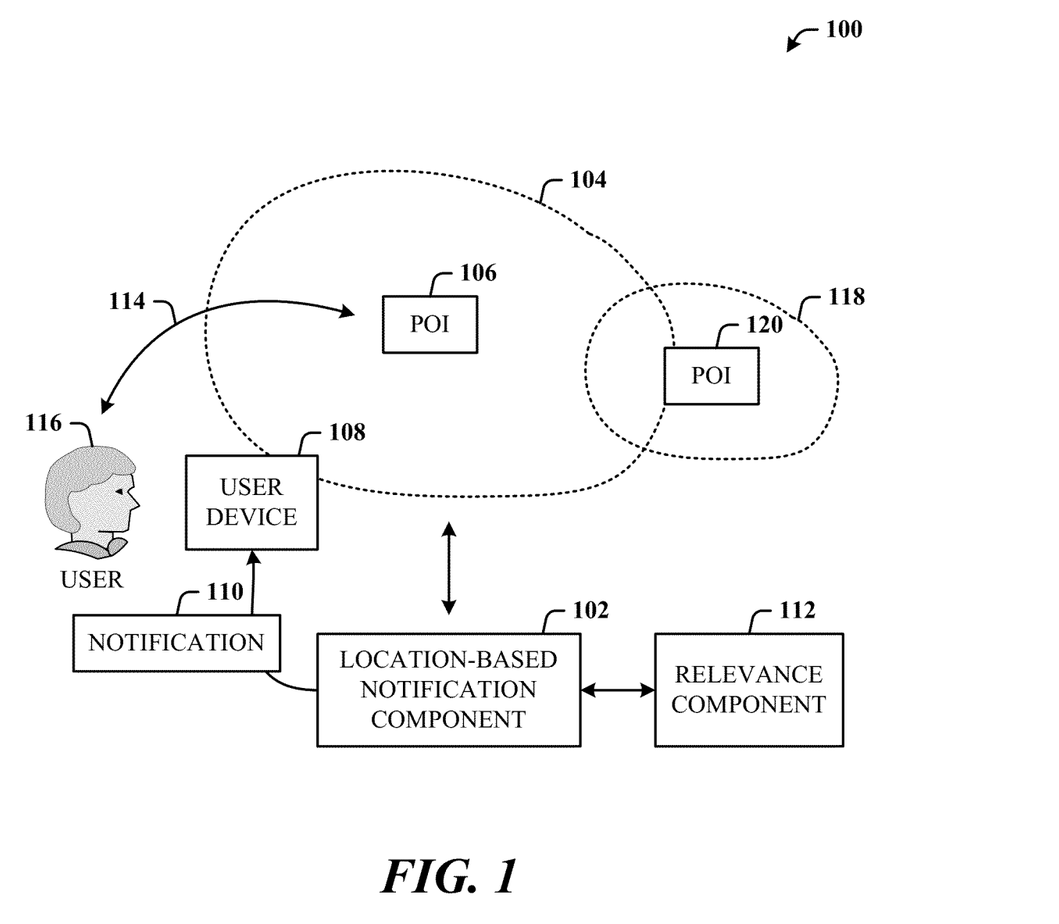
FIG. 1 illustrates a system in accordance with the disclosed architecture.

FIG. 1 illustrates a system 100 in accordance with the disclosed architecture. The system 100 includes a location-based notification component 102 that establishes a virtual perimeter 104 relative to a geographical point of interest (POI) 106, and trigger of the virtual perimeter 104 by a user device 108 communicates a notification 110 to the user device 108. A relevance component 112 dynamically changes (e.g., in perimeter size, area, etc.) the virtual perimeter 104 based on a corresponding change in relevance 114 of the point of interest 106 to a user 116 of the device 108. The virtual perimeter 104 can be changed based on a change in the relevance 114 defined by a parameter associated with the point of interest 106.

In one implementation, the location-based notification component 102 includes a radius-based geo-fence technology that initially creates the virtual perimeter 104 (e.g., static) relative to the point of interest 106 and thereafter adapts to a change in the relevance 114 as defined by a parameter associated with the point of interest 106.

In alternative implementation, the location-based notification component 102 includes a polygon-based geo-fence technology that creates an initial virtual perimeter 104 (e.g., static) relative to the point of interest 106 and thereafter adapts the (size of the) virtual perimeter 104 according to a change in the relevance 114 as defined by a parameter associated with the point of interest 106. The initial virtual perimeters created for each point of interest can be different in size based on the initial sets of parameters for the respective points of interest. Thereafter, based on changes in the sets of parameters, and thus, a possible change(s) in relevance of each perimeter, the perimeters can then change dynamically in size, and continue to change (e.g., as the user location changes, relevance changes, etc.).

The virtual perimeter 104 can be changed based on a change in behavior of the user 116. The behavior can be based on a history of user interactions with points of interest (e.g., POI 106). The virtual perimeter 104 of the point of interest 106 can be increased relative to another virtual perimeter 118 of another point of interest 120 based on the relevance 114. The relevance 114 can be defined by a comparison of corresponding parameters (e.g., hours of operation) of the point of interest 106 and the another point of interest 120.

The virtual perimeter 104 of the point of interest 106 can be increased while the another virtual perimeter 118 of the another point of interest 120 is decreased. The increase and decrease are performed due to the relevance 114 as defined by comparison of corresponding parameters of the point of interest 106 and the another point of interest 120. Alternatively, or in combination therewith, the relevance 114 can be determined based on learned preferences of the user 116 of the device 108. In other words, the relevance is initially determined based on static preferences of the user of the device, and over time, dynamic preferences of the user outweigh the static preferences to dominate computation of the size of the virtual perimeter. That is, the importance (e.g., as determined according to a weighting algorithm) of the static preferences decreases while the importance of the dynamic preferences increases. Thus, at some point in time, the size of the perimeter may be computed predominantly or solely based on the dynamic preferences. The virtual perimeter 104 of the point of interest 106 can be increased in response to increased user interaction with the point of interest 106. In other words, as the virtual perimeter 104 increases, the user device 108 will interact with the virtual perimeter 104 sooner than would otherwise occur.

Figure 2:
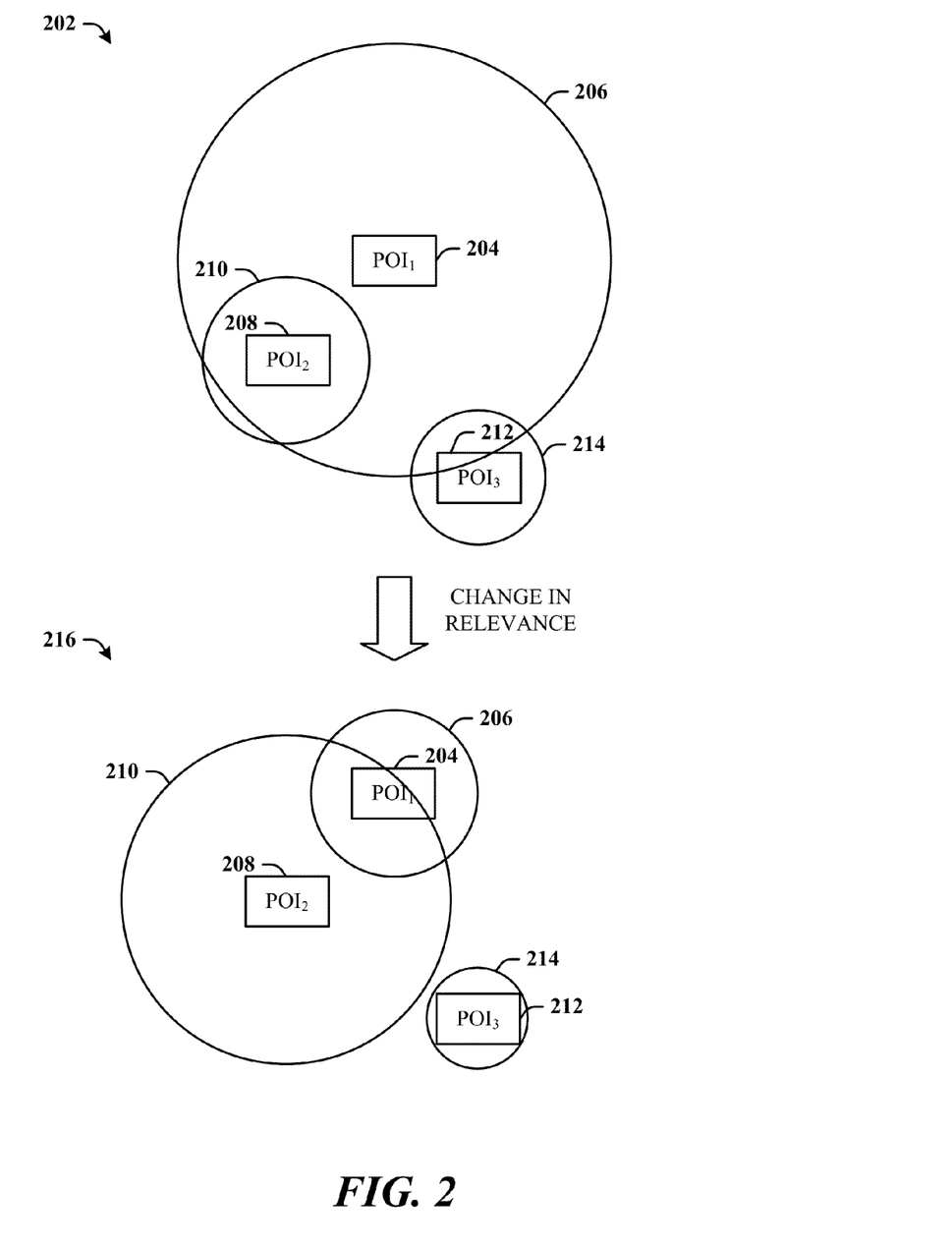
FIG. 2 illustrates a diagram of virtual perimeter changes for points of interest due to corresponding changes in relevance.

FIG. 2 illustrates a diagram 200 of virtual perimeter changes for points of interest due to corresponding changes in relevance. Note that although depicted as a radius-based location-based notification service, the description applies equally to polygon-based location-based notification services.

At 202, three points of interest have defined virtual perimeters. For example, a first POI 204 has a first virtual perimeter (geo-fence) 206, a second POI 208 has a second perimeter 210, and a third POI 212 has a third perimeter 214. The virtual perimeters (206, 210, and 214) can be defined initially based on parameters of the respective points of interest (204, 208, and 212) relative to the user goal.

The dynamic size of the geo-fences is based on static data. For example, the gas price at gas station #1 (POI 204) is significantly cheaper than in the other two stations (POI 208 and POI 212). Consequently, the size of geo-fence 206 increases and the sizes of geo-fences 210 and 214 decrease.

For example, the user goal is to find a gas station in a geographic region. The location-based notification component provides the capability to search (create a query such as "all gas stations") for the gas stations. Once the query is processed, the virtual perimeters (206, 210, and 214) are generated for the corresponding gas stations (POIs 204, 208, and 212). Once the user device triggers a perimeter, a notification is sent to the user device that the corresponding POI is nearby. Triggering occurs by tracking the geolocation (e.g., GPS (global positioning system), triangulation, access point, etc.) of the user device relative to the geolocation coordinates of the perimeter. Once the tracking data is processed against the perimeter data, the notification is automatically sent. Directions can be provided in the notification as to how the user can get to the POI.

At 216, the relevance has changed (e.g., based on learned user preferences). For example, the gas price in gas station #1 (POI 204) is still significantly cheaper than in the other two. However, it is learned that the user prefers the stations that sell gas of a specific brand, in this case, station #2 (POI 208). Consequently, the second perimeter 210 increases and the other perimeters (206 and 214) decrease, accordingly.

Thus, the perimeters (206, 210 and 214) have also changed dynamically to match the change in relevance. As shown at 216, the third POI 208 has increased in relevance, and accordingly, the third perimeter 210 has been dynamically increased in size such that the user device will likely intersect (or trigger) the third perimeter 210 before the other perimeters (206 and 214). Concurrently, the first POI 204 has been reduced in relevance and accordingly, the first virtual perimeter 206 has been reduced in size. Similarly, the third POI 204 has been reduced in relevance and accordingly, the third virtual perimeter 206 has been reduced in size.

In an alternative implementation, it can be the case where only the perimeter of the most relevant POI (e.g., perimeter 210 of POI 208) is changed while the other perimeters remain the same size.

Following is a more detailed description of an algorithm for computing a radius in a radius-based location-based notification implementation.

$R_{max}$ is a maximal radius for a perimeter (also referred to as a reminder), which can be set in advance.

$R_0$ in $[0, R_{max}]$ is a user-defined initial radius for every perimeter.

$C_s$ in $[0, R_{max}/R_0]$ is a coefficient inferred from static data (POI parameters) that is known about the perimeter in advance (e.g., gas price, coffee quality, etc.).

$C_d$ in $[0, R_{max}/(C_s \cdot R_0)]$ is a coefficient inferred from user behavior (e.g., the user prefers Vendor A gas stations).

If $C_d$ equals 0, then the reminder (virtual perimeter) has no value to the user.

If $C_d$ is in $(0,1)$ then the reminder has little value to the user.

If $C_d$ equals 1, then an inference engine does not know the value (related to relevance) of this reminder to the user.

If $C_d$ is in $(1,\infty)$, then the reminder has value (related to relevance) to the user.

$R_f$ is the final radius for a point of interest.

When the perimeter is first set, the initial radius $R_s$ can be calculated by the following equation: $R_s = C_s \cdot R_0$ Thereafter, upon any detected visit of a point of interest (as tracked by the user device) that is related to the above group of reminders, the updated $C_d$ is inferred; and consequently, the final radius of each reminder can be updated using this equation: $R_f = R_0 \cdot C_s \cdot C_d$. Thus, over time, dynamic properties over take the initial properties, making the reminder as relevant to the user as possible.

It is to be understood that where user information (e.g., tracking geo-location information) is performed, the user is provided the option to opt-in and to opt-out of allowing this information to be captured and utilized. Accordingly, a security component can be provided which enables the user to opt-in and opt-out of tracking information as well as personal information that may have been obtained and utilized thereafter. The user can be provided with notice of the collection of information, for example, and the opportunity to provide or deny consent to do so. Consent can take several forms. Opt-in consent imposes on the user to take an affirmative action before the data is collected. Alternatively, opt-out consent imposes on the subscriber to take an affirmative action to prevent the collection of data before that data is collected. This is similar to implied consent in that by doing nothing, the user allows the data collection after having been adequately informed. The security component ensures the proper collection, storage, and access to the user information while allowing for the dynamic selection and presentation of the content, features, and/or services that assist the user to obtain the benefits of a richer user experience and to access to more relevant information.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of inter-related states or events, such as in a state diagram. Moreover, not all acts illustrated in a methodology may be required for a novel implementation.

Figure 3:
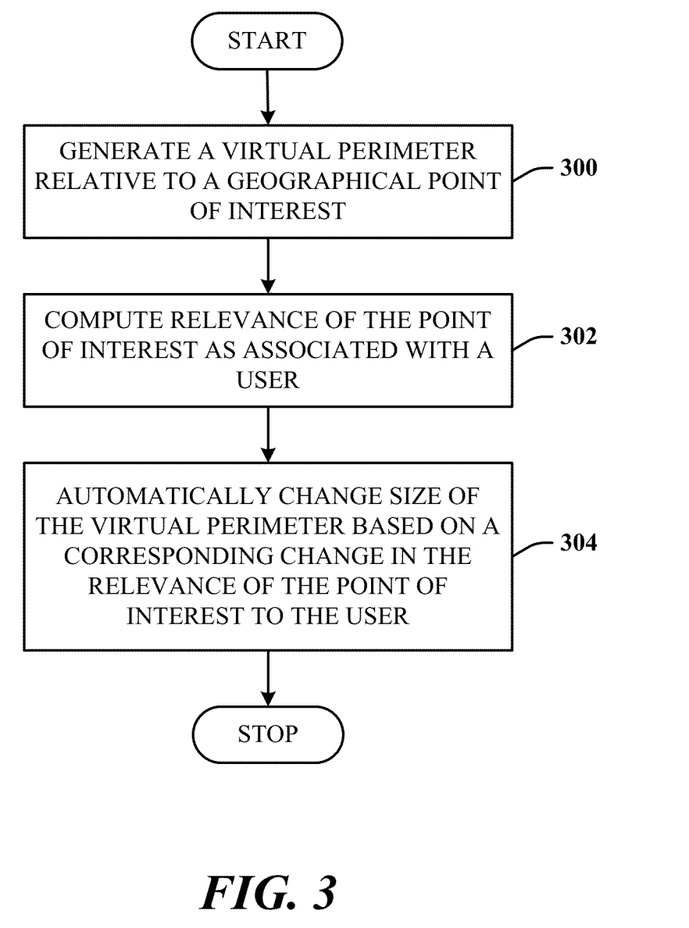
FIG. 3 illustrates a method in accordance with the disclosed architecture.

FIG. 3 illustrates a method in accordance with the disclosed architecture. At 300, a virtual perimeter is generated relative to a geographical point of interest. At 302, relevance of the point of interest as associated with a user is computed. At 304, size of the virtual perimeter is automatically changed based on a corresponding change in the relevance of the point of interest to the user.

Figure 4:
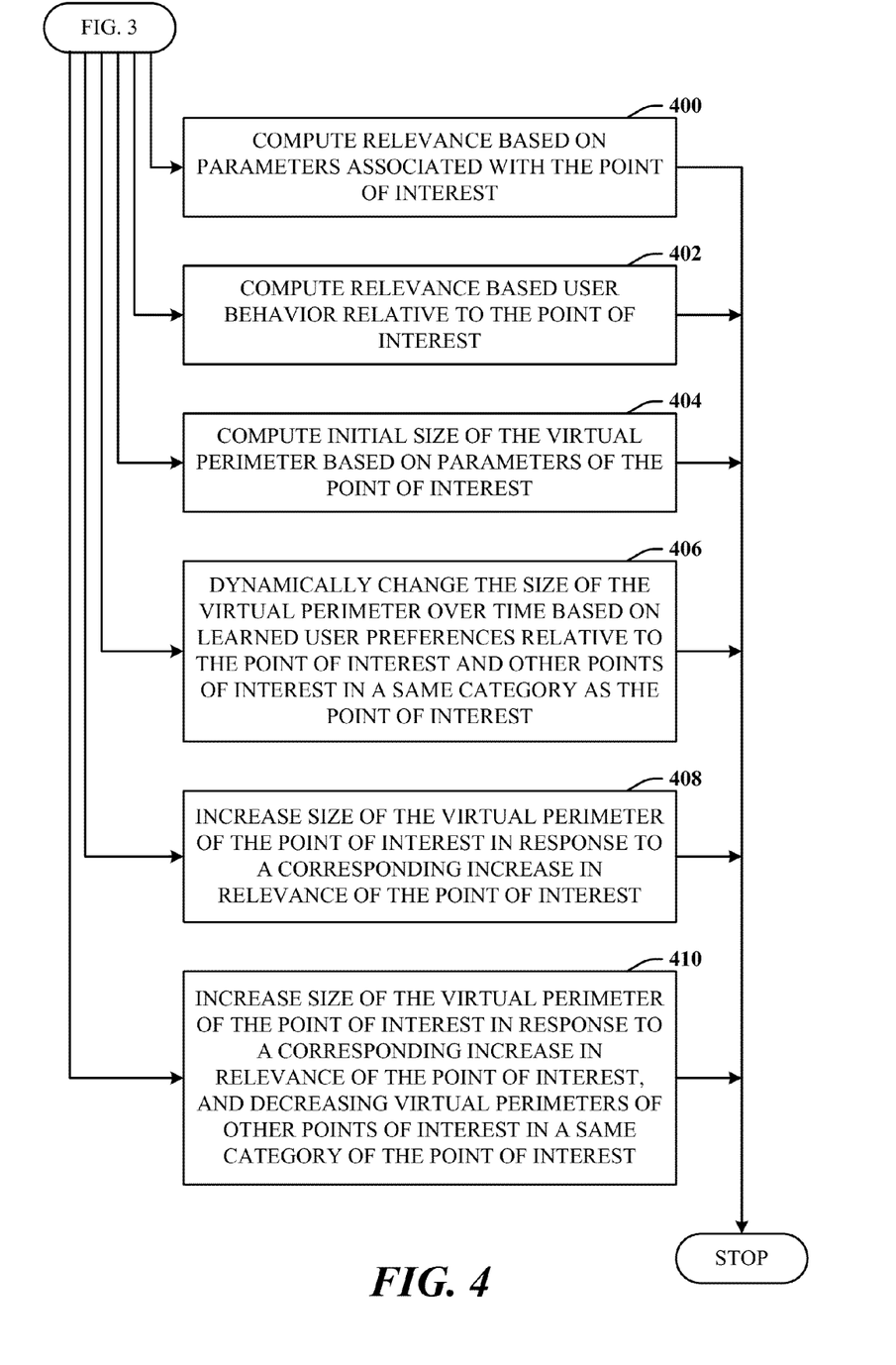
FIG. 4 illustrates further aspects of the method of FIG. 3.

FIG. 4 illustrates further aspects of the method of FIG. 3. Note that the flow indicates that each block can represent a step that can be included, separately or in combination with other blocks, as additional aspects of the method represented by the flow chart of FIG. 3. At 400, the relevance is computed based on parameters associated with the point of interest. At 402, the relevance is computed based user behavior relative to the point of interest. At 404, an initial size of the virtual perimeter is computed based on parameters of the point of interest. At 406, the size of the virtual perimeter is dynamically changed over time based on learned user preferences relative to the point of interest and other points of interest in a same category as the point of interest. At 408, the size of the virtual perimeter of the point of interest is increased in response to a corresponding increase in relevance of the point of interest.

Figure 5:
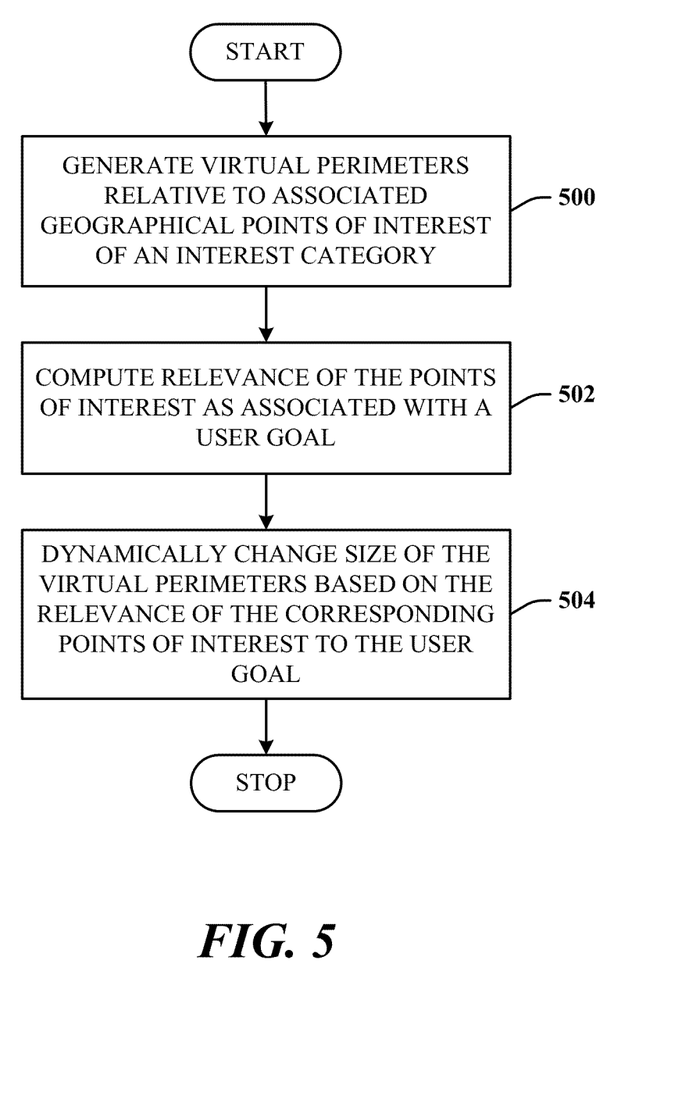
FIG. 5 illustrates an alternative method in accordance with the disclosed architecture.

FIG. 5 illustrates an alternative method in accordance with the disclosed architecture. At 500, virtual perimeters are generated relative to associated geographical points of interest of an interest category. At 502, relevance of the points of interest as associated with a user goal is computed. At 504, size of the virtual perimeters is dynamically changed based on the relevance of the corresponding points of interest to the user goal.

Figure 6:
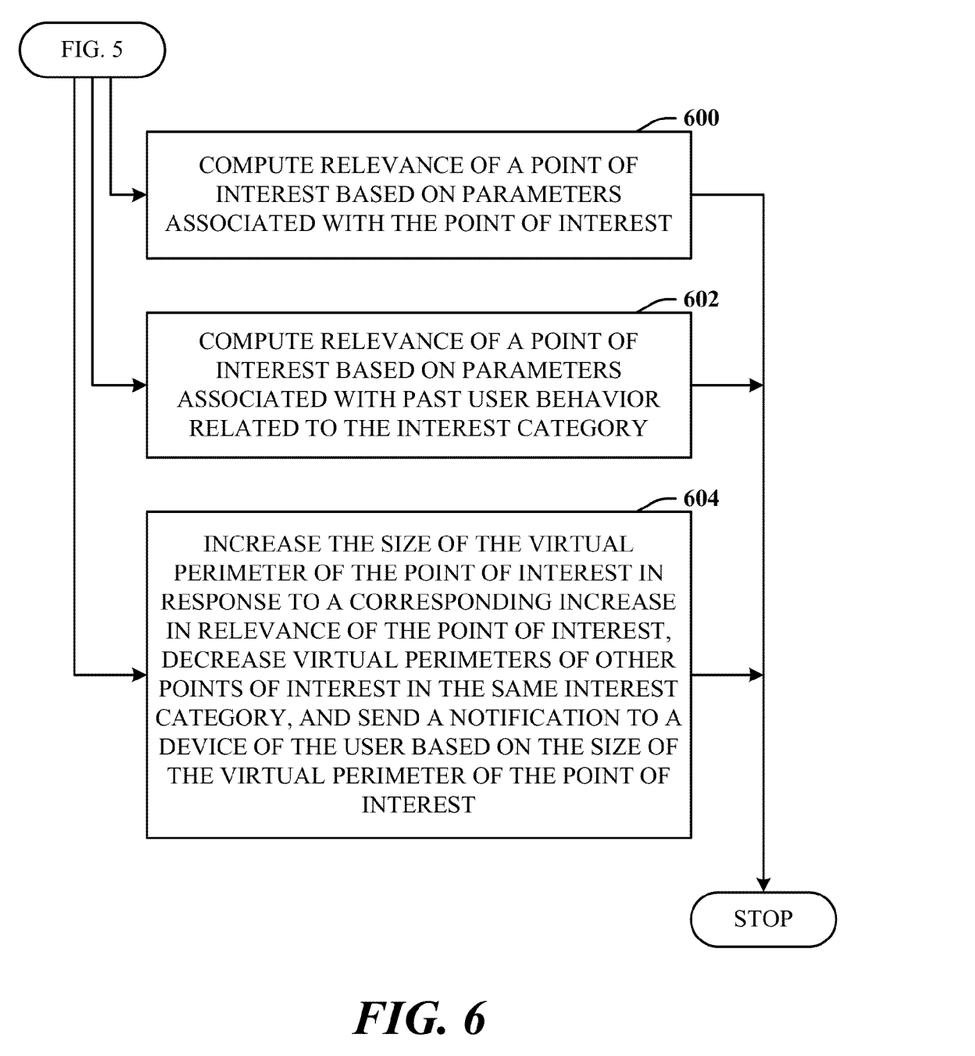
FIG. 6 illustrates further aspects of the method of FIG. 5.

FIG. 6 illustrates further aspects of the method of FIG. 5. Note that the flow indicates that each block can represent a step that can be included, separately or in combination with other blocks, as additional aspects of the method represented by the flow chart of FIG. 5. At 600, the relevance of a point of interest is computed based on parameters associated with the point of interest. At 602, the relevance of a point of interest is computed based on parameters associated with past user behavior related to the interest category. At 604, the size of the virtual perimeter of the point of interest is increased in response to a corresponding increase in relevance of the point of interest, virtual perimeters of other points of interest in the same interest category are decreased, and a notification is sent to a device of the user based on the size of the virtual perimeter of the point of interest.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
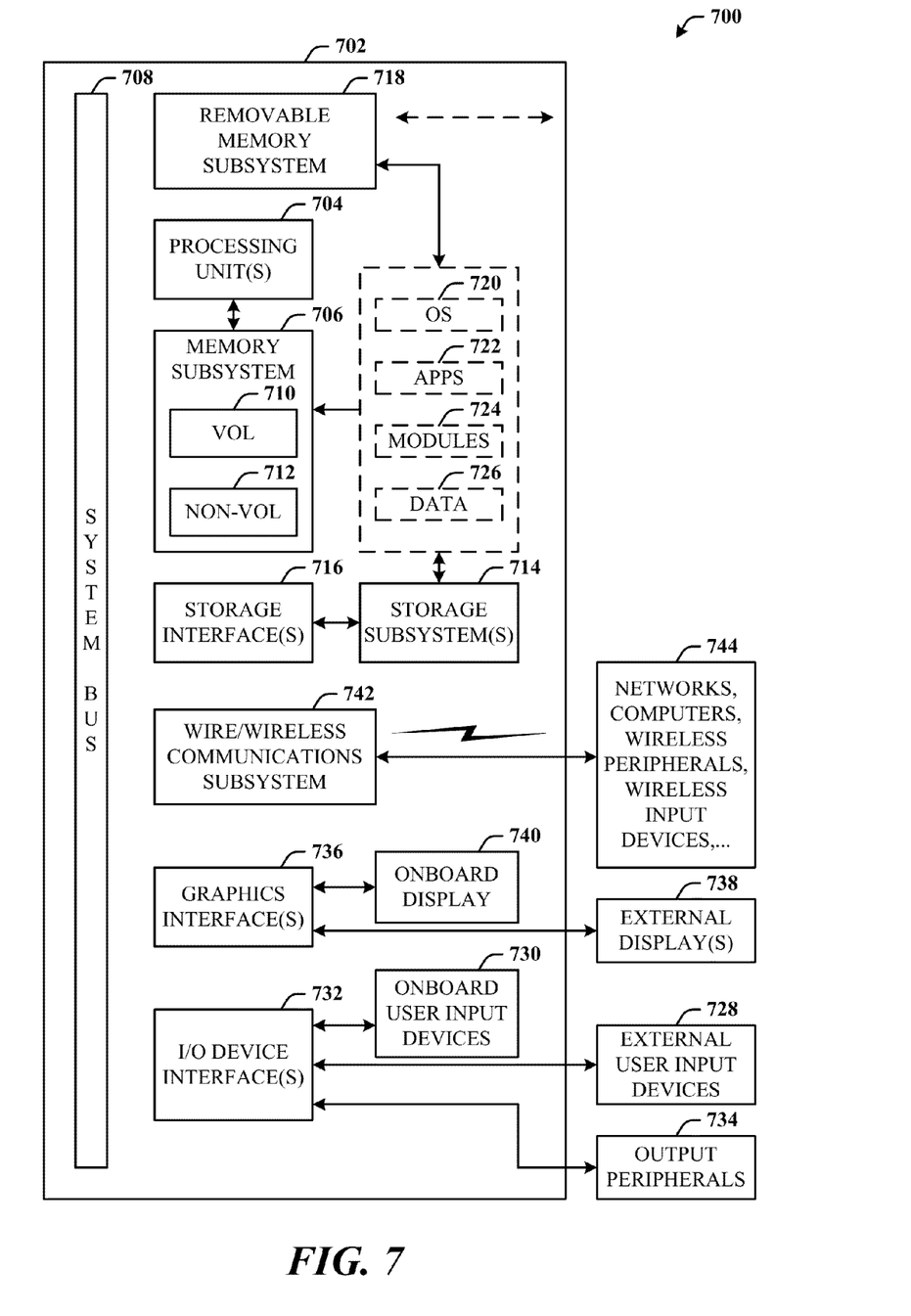
FIG. 7 illustrates a block diagram of a computing system that executes adaptive geo-fence processing in accordance with the disclosed architecture.

Referring now to FIG. 7, there is illustrated a block diagram of a computing system 700 that executes adaptive geofence processing in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a computer-readable storage such as a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include computer-readable storage (physical storage media) such as a volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components. The storage subsystem(s) 714 (physical storage media) can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The operating system 720, one or more application programs 722, other program modules 724, and/or program data 726 can include the entities and components of the system 100 of FIG. 1, the entities and components of the diagram 200 of FIG. 2, and the methods represented by the flowcharts of FIGS. 3-6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 702 and includes volatile and non-volatile internal and/or external media that is removable or non-removable. For the computer 702, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 8:
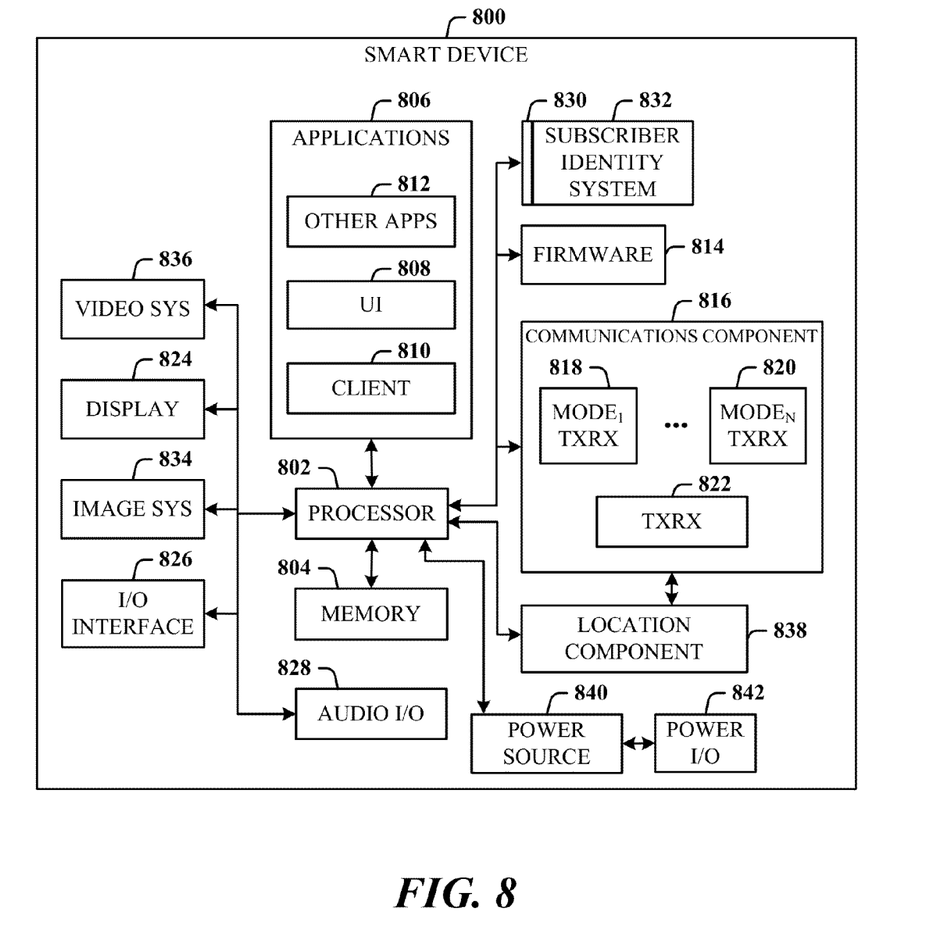
FIG. 8 illustrates a schematic block diagram of an exemplary smart mobile device that executes adaptive geo-fence processing in accordance with the disclosed architecture.

FIG. 8 illustrates a schematic block diagram of an exemplary smart mobile device 800 that executes adaptive geo-fence processing in accordance with the disclosed architecture. In order to provide additional context for various aspects thereof, FIG. 8 and the following discussion are intended to provide a brief, general description of a suitable environment in which the various aspects of the innovation can be implemented. While the description includes a general context of computer-executable instructions, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the inventive methods can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

The smart device 800 (e.g., a cell phone, PDA) can typically include a variety of computer-readable media. Computer-readable media can be any available media accessed by the handset systems and includes volatile and non-volatile media, removable and non-removable media. By way of example, and not limitation, computer-readable media can comprise device storage media and communication media. Storage media includes volatile and/or non-volatile, removable and/or non-removable media implemented in any method or technology for the storage of information such as computer-readable instructions, data structures, program modules or other data. Storage media can include, but is not limited to, RAM, ROM, EEPROM, flash memory or other memory technology, CD-ROM, digital video disc (DVD) or other optical disk storage, magnetic tape, magnetic disk storage or other magnetic storage devices, or any other medium which can be used to store the desired information and which can be accessed by the mobile device systems.

The smart device 800 includes a processor 802 for controlling and processing onboard operations and functions. A memory 804 interfaces to the processor 802 for the storage of data and one or more applications 806 (e.g., a video player software, user feedback component software, etc.).

The applications 806 can include the components of the system 100 of FIG. 1, one or more of the entities of the diagram 200 of FIG. 2, and methods as provided herein in FIGS. 3-6, for example. The applications also facilitate direct (e.g., wired and/or wireless) communications with the external systems.

The applications 806 can also include a user interface (UI) application 808 that operates with a client 810 (e.g., operating system) to facilitate user interaction with handset functionality and data, for example, answering/initiating calls, entering/deleting data, configuring settings, address book manipulation, multimode interaction, etc. The applications 806 can include other applications 812 that came installed with the device 800 and/or can be installed as add-ons or plug-ins to the client 810 and/or UI 808, for example, or for other purposes (e.g., processor, firmware, etc.).

The other applications 812 can include voice recognition of predetermined voice commands that facilitate user control, call voice processing, voice recording, messaging, e-mail processing, video processing, image processing, music play, as well as subsystems or components described infra. Some of the applications 806 can be stored in the memory 804 and/or in a firmware 814, and executed by the processor 802 from either or both the memory 804 or/and the firmware 814. The firmware 814 can also store code for execution in power-up initialization and control during normal operation of the smart device 800.

A communications component 816 can interface to the processor 802 to facilitate wired/wireless communications with external systems, for example, cellular networks, VoIP (voice-over-IP) networks, local wireless networks or personal wireless networks such as Wi-Fi, Wi-Max, and so on. Here, the communications component 816 can also include a multimode communications subsystem for providing cellular communications via different cellular technologies. For example, a first cellular transceiver 818 (e.g., GSM) can be one mode and an Nth transceiver 820 can provide cellular communications via an Nth cellular network (e.g., UMTS), where N is a positive integer. The communications component 816 can also include a transceiver 822 for unlicensed communications (e.g., Wi-Fi, Wi-Max, Bluetooth, etc.) for corresponding communications. The communications component 816 can also facilitate communications reception from terrestrial radio networks (e.g., broadcast), digital satellite radio networks, and Internet-based radio services networks.

The smart device 800 can process IP data traffic via the communications component 816 to accommodate IP traffic from an IP network such as, for example, the Internet, a corporate intranet, a home broadband network, a personal area network, etc., via an ISP or broadband cable provider. Thus, VoIP traffic can be utilized by the smart device 800 and IP-based multimedia content can be received in an encoded and/or decoded format.

The smart device 800 includes a display 824 for displaying multimedia that include text, images, video, telephony functions (e.g., a Caller ID function), setup functions, menus, etc. The display 824 can also accommodate the presentation of multimedia content (e.g., music metadata, messages, wallpaper, graphics, etc.).

An input/output (I/O) interface 826 can be provided for serial/parallel I/O of data and/or signals (e.g., USB, and/or IEEE 1394) via a hardwire connection, and other I/O devices (e.g., a keyboard, keypad, mouse, interface tether, stylus pen, touch screen, etc.). The I/O interface 826 can be utilized for updating and/or troubleshooting the smart device 800, for example.

Audio capabilities can be provided via an audio I/O component 828, which can include a speaker for the output of audio signals related to, for example, indication that the user pressed the proper key or key combination to initiate the user feedback signal, call signals, music, etc. The audio I/O component 828 also facilitates the input of audio signals via a microphone to record data and/or telephony voice data, and for inputting voice signals for telephone conversations.

The smart device 800 can include a slot interface 830 for accommodating a subscriber identity system 832 that can accommodate a SIM or universal SIM (USIM), and interfacing the subscriber identity system 832 with the processor 802. However, it is to be appreciated that the subscriber identity system 832 can be manufactured into the smart device 800 and updated by downloading data and software thereinto, such as the access information described herein.

An image capture and processing system 834 (e.g., a camera) can be provided for decoding encoded image content. Additionally, as indicated, photos can be obtained via an associated image capture subsystem of the image system 834. The smart device 800 can also include a video component 836 for processing video content received and, for recording and transmitting video content.

Optionally, a geolocation component 838 (e.g., GPS-global positioning system) facilitates receiving geolocation signals (e.g., from satellites via the communications component 816) that define the location of the smart device 800. Alternatively, or in combination therewith, the geolocation component 838 can facilitate triangulation processing for locating the smart device 800.

The smart device 800 also includes a power source 840 in the form of batteries and/or an AC power subsystem, which power source 840 can interface to an external power system or charging equipment (not shown) via a power I/O component 842.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system, comprising:
   a location-based notification component that establishes a virtual perimeter relative to a geographical point of interest, and by triggering of the virtual perimeter by a user device, communicates a notification to the user device;
   a relevance component that dynamically changes the virtual perimeter based on a corresponding change in relevance of the point of interest to a user of the device; and
   a processor that executes computer-executable instructions associated with at least one of the location-based notification component or the relevance component.

2. The system of claim 1, wherein the virtual perimeter is changed based on a change in the relevance defined by a parameter associated with the point of interest.

3. The system of claim 1, wherein the location-based notification component includes a radius-based geo-fence technology that creates an initial virtual perimeter relative to the point of interest and thereafter adapts the virtual perimeter according to a change in the relevance as defined by a parameter associated with the point of interest.

4. The system of claim 1, wherein the virtual perimeter is changed based on a change in behavior of the user.

5. The system of claim 4, wherein the behavior is based on a history of user interactions with points of interest.

6. The system of claim 1, wherein the virtual perimeter of the point of interest increases relative to another virtual perimeter of another point of interest based on relevance, the relevance defined by comparison of corresponding parameters of the point of interest and the another point of interest.

7. The system of claim 1, wherein the virtual perimeter of the point of interest increases while another virtual perimeter of another point of interest decreases, the increase and decrease due to relevance as defined by comparison of corresponding parameters of the point of interest and the another point of interest.

8. The system of claim 7, wherein the relevance is initially determined based on static preferences of the user of the device, and over time, dynamic preferences of the user outweigh the static preferences to dominate computation of the size of the virtual perimeter.

9. The system of claim 7, wherein the virtual perimeter of the point of interest increases in response to increased user interaction with the point of interest.

10. A computer-implemented method, comprising acts of:
    generating a virtual perimeter relative to a geographical point of interest;
    computing relevance of the point of interest as associated with a user;
    automatically changing size of the virtual perimeter based on a corresponding change in the relevance of the point of interest to the user; and
    utilizing a processor that executes instructions stored in memory to perform at least one of the acts of generating, computing, or changing.

11. The method of claim 10, further comprising computing the relevance based on parameters associated with the point of interest.

12. The method of claim 10, further comprising computing the relevance based on user behavior relative to the point of interest.

13. The method of claim 10, further comprising computing an initial size of the virtual perimeter based on parameters of the point of interest.

14. The method of claim 10, further comprising dynamically changing the size of the virtual perimeter over time based on learned user preferences relative to the point of interest and other points of interest in a same category as the point of interest.

15. The method of claim 10, further comprising increasing the size of the virtual perimeter of the point of interest in response to a corresponding increase in relevance of the point of interest.

16. The method of claim 10, further comprising increasing the size of the virtual perimeter of the point of interest in response to a corresponding increase in relevance of the point of interest, and decreasing virtual perimeters of other points of interest in a same category of the point of interest.

17. A computer-implemented method, comprising acts of:
generating virtual perimeters relative to associated geographical points of interest of an interest category;
computing relevance of the points of interest as associated with a user goal;
dynamically changing size of the virtual perimeters based on the relevance of the corresponding points of interest to the user goal; and
utilizing a processor that executes instructions stored in memory to perform at least one of the acts of generating, computing, or changing.

18. The method of claim 17, further comprising computing the relevance of a point of interest based on parameters associated with the point of interest.

19. The method of claim 17, further comprising computing the relevance of a point of interest based on parameters associated with past user behavior related to the interest category.

20. The method of claim 17, further comprising increasing the size of the virtual perimeter of the point of interest in response to a corresponding increase in relevance of the point of interest, decreasing virtual perimeters of other points of interest in the same interest category, and sending a notification to a device of the user based on the size of the virtual perimeter of the point of interest.

* * * * *